(12) United States Patent
Du et al.

(10) Patent No.: US 8,937,115 B2
(45) Date of Patent: *Jan. 20, 2015

(54) ADHESIVE FOR FILLING GAPS BETWEEN STONES

(75) Inventors: Kunwen Du, Wuhan (CN); Ziqiang Xin, Wuhan (CN); Kunwu Du, Wuhan (CN)

(73) Assignee: Wuhan Keda Marble Protective Materials Co., Ltd., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,482

(22) Filed: Jul. 7, 2011

(65) Prior Publication Data

US 2011/0263771 A1 Oct. 27, 2011

Related U.S. Application Data

(63) Continuation of application No. PCT/CN2010/071282, filed on Mar. 25, 2010.

(30) Foreign Application Priority Data

Mar. 25, 2009 (CN) .......................... 2009 1 0061335

(51) Int. Cl.
*C08L 63/10* (2006.01)
*C08K 5/103* (2006.01)
*C08K 3/26* (2006.01)
*C09J 167/06* (2006.01)

(52) U.S. Cl.
CPC ............... *C09J 167/06* (2013.01); *C08K 5/103* (2013.01)
USPC ........... 523/401; 523/456; 523/458; 524/318; 524/425; 524/431; 524/451

(58) Field of Classification Search
USPC ........... 523/401, 446, 456, 458; 524/318, 425
See application file for complete search history.

(56) References Cited

U.S. PATENT DOCUMENTS

| 3,267,056 | A | * | 8/1966 | Ihde, Jr. et al. ............... | 524/188 |
|---|---|---|---|---|---|
| 3,271,182 | A | * | 9/1966 | Varlet ........................... | 427/302 |
| 3,438,903 | A | * | 4/1969 | Prahl ............................ | 252/478 |
| 3,773,886 | A | * | 11/1973 | Starr et al. .................... | 264/245 |
| 3,844,995 | A | * | 10/1974 | Kloker et al. ................. | 523/514 |
| 3,937,678 | A | * | 2/1976 | Yasuda et al. ................. | 106/270 |
| 4,211,686 | A | * | 7/1980 | Nishikawa et al. ........... | 523/513 |
| 5,120,476 | A | * | 6/1992 | Scholz .......................... | 264/401 |
| 5,373,046 | A | * | 12/1994 | Okamura et al. ............. | 524/413 |
| 8,674,003 | B2 | * | 3/2014 | Du et al. ........................ | 523/513 |
| 2009/0004255 | A1 | * | 1/2009 | Uchida et al. ................. | 424/447 |
| 2010/0210745 | A1 | * | 8/2010 | McDaniel et al. ............. | 521/55 |

FOREIGN PATENT DOCUMENTS

| CN | 101851483 | A | * | 6/2010 |
|---|---|---|---|---|
| CN | 101857790 | A | * | 6/2010 |
| JP | 2002-322423 | | * | 11/2002 |
| JP | 2002322423 | A | * | 11/2002 |
| JP | 2006-036839 | A | * | 2/2006 |
| JP | 2006036839 | A | * | 2/2006 |

* cited by examiner

*Primary Examiner* — Tae H Yoon
(74) *Attorney, Agent, or Firm* — Matthias Scholl P.C.; Matthias Scholl

(57) ABSTRACT

An adhesive for filling gaps between stones, the adhesive including at least 100 weight parts of an unsaturated polyester resin suitable for air-drying, between 1 and 5 weight parts of hydrogenated castor oil, between 10 and 250 weight parts of a filler, and between 1 and 15 weight parts of an anti-shrinking agent. The adhesive has good permeability and shrinkage resistance, and high brightness after being polished.

8 Claims, No Drawings

ADHESIVE FOR FILLING GAPS BETWEEN STONES

CROSS-REFERENCE TO RELATED APPLICATIONS

This application is a continuation of International Patent Application No. PCT/CN2010/071282 with an international filing date of Mar. 25, 2010, designating the United States, now pending, and further claims priority benefits to Chinese Patent Application No. 200910061335.3 filed Mar. 25, 2009. The contents of all of the aforementioned applications, including any intervening amendments thereto, are incorporated herein by reference.

BACKGROUND OF THE INVENTION

1. Field of the Invention

The invention relates to an adhesive of colored stone for filling in the gaps between stones. The adhesive is also suitable for filling in gaps between ceramics.

2. Description of the Related Art

Unsaturated resin adhesives are mainly used for filling in and bonding stone. In China, they are mainly used for marble, thereby with a nickname of marble glue. This kind of bonding using filling in can only bear a minor load, belonging to non-structural bonding. Structural bonding means supporting a big load. Different from structural bonding, non-structural bonding employs organic adhesives to mend, fill in, strengthen, and fix the defects of stone, for example, fissures, cracks, apertures, and sand holes.

Bonding using filling in (non-structural bonding) has huge difference from structural bonding in load-carrying capability. Bonding using filling in basically does not bear load, and the function of the filling in is mainly to beautify stone and standardize product size. In the past few years, with the rapid development of bonding adhesives, marble glue has been widely applied in household decoration, quick positioning, amendment, splicing, and filling in gaps of stone.

Marble glue is mainly used for the bonding of stone with the ground, or the bonding of stone with wall having a height of less than 9 meters. Marble glue is required to bear a minor load, and thus the bonding strength thereof should meet a certain standard, but the requirement for air dry, brightness, contractility, and permeability is low. Gap-filling adhesives are mainly used for filling in gaps between stone and need contact with air. Thus, there is a low requirement on the bonding strength of gap-filling adhesives in contrast to that of marble glue, but the air drying, brightness, contractility, and permeability thereof should be high.

Marble glue, if used as a gap-filling adhesive, has the following disadvantages: a) poor air drying property, and viscidity after curing; b) there is a color difference between polished glue and stone; 3) poor contractility resistance, which makes the cured glue concave or separate from stone; and 4) poor permeability, which results in an incomplete filling in or produces holes.

SUMMARY OF THE INVENTION

In view of the above-described problems, it is one objective of the invention to provide a gap-filling adhesive of colored stone.

To achieve the above objectives, in accordance with one embodiment of the invention, there is provided an adhesive comprising at least 100 weight parts of an unsaturated polyester resin suitable for air-drying, between 1 and 5 weight parts of hydrogenated castor oil, between 10 and 250 weight parts of a filler, and between 1 and 15 weight parts of an anti-shrinking agent.

In a class of this embodiment, the adhesive comprises at least 100 weight parts of the unsaturated polyester resin suitable for air-drying, between 1 and 5 weight parts of the hydrogenated castor oil, between 50 and 200 weight parts of heavy calcium carbonate, between 2 and 10 weight parts of talcum powder, and between 1 and 15 weight parts of the anti-shrinking agent.

In a class of this embodiment, the filler is selected from the group consisting of calcium carbonate, talcum powder, heavy calcium carbonate, quartz powder, dolomite powder, barium sulfate, or a mixture thereof.

In a class of this embodiment, the adhesive further comprises between 1 and 5 weight parts of an active diluent.

In a class of this embodiment, the anti-shrinking agent is selected from the group consisting of polypropyl acetate, poly(adipate-co-propanetriol), poly vinyl acetate, polyacrylate, polystyrene, polyethylene, polyvinyl chloride, polymethyl methacrylate, or a mixture thereof.

In a class of this embodiment, the unsaturated polyester resin suitable for air-drying is selected from the group consisting of dicyclopentadiene-modified unsaturated polyester resin synthesized using half-esterification, allyl glycidyl ether-modified unsaturated polyester resin, or trimethylolpropane diallyl ether-modified unsaturated polyester resin; to the unsaturated polyester resin suitable for air-drying, a diluent, accelerator, and inhibitor of polymerization are added according to conventional usage amount (the unsaturated polyester resin suitable for air-drying purchased from market has been added with a diluent, accelerator, and inhibitor of polymerization).

In a class of this embodiment, the adhesive comprises 100 weight parts of the unsaturated polyester resin suitable for air-drying, between 2 and 4 weight parts of the hydrogenated castor oil, between 5 and 10 weight parts of the anti-shrinking agent, between 75 and 150 weight parts of calcium carbonate, and between 4 and 8 weight parts of talcum powder.

In a class of this embodiment, the adhesive further comprises between 5 and 20 weight parts of rutile titanium dioxide.

In a class of this embodiment, the adhesive further comprises a colored pigment.

In a class of this embodiment, the calcium carbonate used is between 300 and 1,000 mesh on the average.

In a class of this embodiment, the active diluent is selected from the group consisting of styrene, α-methyl styrene, glycerol diallyl ether adipate, diallyl phthalate, 2-chlorostyrene, p-tert-butyl styrene, or a mixture thereof.

In a class of this embodiment, in the process of the preparation of the unsaturated polyester resin suitable for air-drying, cycloalkane diols, neopentyl glycol, hydrogenated bisphenol A, trans-double dehydration mannitol, or isophthalic acid is added.

Advantages of the invention are summarized below. 1) The adhesive comprises active diluents, and thus is easy to blend. The resulting colloid is fine, and after curing agents added, the adhesive has a certain fluidity and good permeability and can permeate into small cracks in the stone. Because the colloid is fine, so is the filling joint, which increases the sense of beauty. 2) The adhesive comprises the unsaturated polyester resin suitable for air-drying and thus is not sticky after curing, which means an instant polishing can be carried out and no black spots occurs in the filling joints. 3) The adhesive comprises anti-shrinking agents, and the shrinking percentage can be controlled within 1%. After the adhesive is cured, no concave formed and the adhesive will not separate from stone. 4) The polished adhesive has a brightness equivalent as that of polished stone. The brightness of the adhesive is dependent on the hardness of the unsaturated polyester resin. The hardness is relevant to the softening point of the polyester. Thus, the hardness can be improved by increasing the softening point of the polyester. 5) The adhesive has good ageing resistance and stable colors, and particularly, the white adhesive is not easy to turn yellow (the rutile titanium dioxide makes the color stable). 6) The invention solves the difficult problem of gap-filling of stone and as a new category of marble glue, the adhesive enriches the type of marble glue.

DETAILED DESCRIPTION OF THE EMBODIMENTS

For further illustrating the invention, experiments detailing an adhesive of colored stone are described below. It should be noted that the following examples are intended to describe and not to limit the invention.

When cured in the air, an unsaturated polyester resin suitable for air-drying is dried to form film, free of interference from oxygen, and the surface thereof is not sticky. The characteristic is known as air dry.

The principle of air dry is described below.

When an unsaturated polyester resin (UPR in short) is cured at normal temperature, the surface thereof is often sticky, which causes inconvenience for use. The curing mechanism of UPR is based on the radical copolymerization. The activity of free radicals determines the polymerization rate thereby affecting the size of the polymer molecular weight.

If oxygen is involved in the curing of unsaturated polyester resins, a sticky surface will form. Free radical R· generated at early stage contacts with oxygen to yield a polymer peroxy radical $RO_2·$. The activity of R· is stronger than that of $RO_2·$. The half life of R· is $10^{-8}$ s, and that of $RO_2·$ is $10^{-2}$ s. On the surface, the $RO_2·$ is dominant, thereby inhibiting the increase of polymer molecular weight. However, the polymer peroxy radical $RO_2·$ easily contacts with hydrogen connected to positively-charged carbon to yield a polymer hydroperoxide, that is, $$ROO·+HR_1 \rightarrow ROOH+R_1·.$$

The polymer hydroperoxide can produce free radicals with strong activity to make reaction proceed to yield high molecular weight polymers.

For example, allyl ether ($CH_2\!=\!CH\!-\!CH_2\!-\!O\!-\!$) and non-conjugated double bonds ($-CH\!=\!CH\!-\!CH_2\!-\!CH\!=\!CH\!-\!$) have positive carbon atoms, and thus have the capacity of automatic oxygen absorption.

The anti-shrinkage mechanism of an anti-shrinking agent of the invention is described below. When a gap-filing adhesive of the invention is curing, the anti-shrinking agent experiences thermal expansion. The expansion offsets the volume contraction originated from the curing of the polyester around the corner. Subsequently, the two phases are cooled simultaneously. Because the anti-shrinking agent has bigger shrinking percentage than the polyester, many small holes form at the interface of the two phases. The formation of the holes eliminates the internal stress, and thus the polyester no longer contracts.

The unsaturated polyester resin suitable for air-drying includes but is not limited to dicyclopentadiene-modified unsaturated polyester resin synthesized using half-esterification, allyl glycidyl ether-modified unsaturated polyester resin, or trimethylolpropane diallyl ether-modified unsaturated polyester resin. All these polyester resins can be purchased from markets. The shrinking percentage of the unsaturated polyester resin suitable for air-drying is about between 5 and 8%.

The active diluent selected from the group consisting of diallyl phthalate, 2-chlorostyrene, and p-tert-butyl styrene, has capacity of anti-shrinking. As an active diluent, glycerol diallyl ether adipate has capacity of air dry. All these active diluents can be purchased from markets. As needed, other active diluents can also be applied.

The anti-shrinking agent is selected from the group consisting of polypropyl acetate, poly(adipate-co-propanetriol), poly vinyl acetate, polyacrylate, polystyrene, polyethylene, polyvinyl chloride, polymethyl methacrylate, or a mixture thereof.

The properties of conventional marble glue are given below:

| | Properties Color | Conventional marble glue | | |
|---|---|---|---|---|
| | | White | Cream-colored | Transparent |
| Mechanical properties | Pressure-shear (MPa) | 7.6 | 10.8 | 10.9 |
| | Tensile-shear (MPa) | 13.1 | 13.3 | 11.9 |
| | Rebound deflection (MPa) | 5059.8 | 5491.9 | 2386.2 |
| | Impact flexibility (KJ/m$^2$) | 1.68 | 2.00 | 2.48 |
| | Hardness (HSD) | 41.2 | 43.4 | 54.9 |

Technical indexes according to building materials industry standards JC/T989-2006, PRC. are given below:

| | | Technical indexes | |
|---|---|---|---|
| Items | | High-class products | Qualified products |
| Color, appearance, and state in a container | | Products should be fine viscous paste with uniform color, without obvious isolation and gel as well as rough particles, easy to stir, and color or package of products should be clearly distinguishable. | |
| Rebound deflection (MPa) ≥ | | 2000 | 1500 |
| Impact flexibility (KJ/m$^2$) ) ≥ | | 3.0 | 2.0 |
| Pressure-shear Stone-stone strength (MPa) ≥ | Standard conditions | 8.0 | 7.0 |

Example 1

An adhesive of colored stone comprises 100 weight parts of an unsaturated polyester resin suitable for air-drying, 5 weight parts of hydrogenated castor oil, 50 weight parts of heavy calcium carbonate (1,000 mesh on the average), 2 weight parts of talcum powder, and one weight part of an anti-shrinking agent. The adhesive is cream-colored.

The unsaturated polyester resin suitable for air-drying is dicyclopentadiene-modified unsaturated polyester resin synthesized using half-esterification. The anti-shrinking agent is one weight part of polyacrylate.

Measurement shows that, the pressure-shear strength of the adhesive is 16.8 MPa, the tensile-shear strength thereof is 15.9 MPa, the rebound deflection thereof is 6306.1 MPa, the impact flexibility thereof is 2.86 KJ/m$^2$, the hardness (HSD) thereof is 61.7, and the shrinking percentage thereof is 2.41%.

In use, the adhesive is mixed and stirred uniformly with a curing agent, a mixing ratio of the adhesive to the curing agent being 100:3.

Example 2

An adhesive of colored stone comprises 100 weight parts of an unsaturated polyester resin suitable for air-drying, one weight part of hydrogenated castor oil, 170 weight parts of calcium carbonate (300 mesh on the average), 30 weight parts of heavy calcium carbonate, 3 weight parts of talcum powder, 15 weight parts of an anti-shrinking agent, and 5 weight parts of an active diluents. The adhesive is cream-colored.

The unsaturated polyester resin suitable for air-drying is allyl glycidyl ether-modified unsaturated polyester resin. The anti-shrinking agent is 7 weight parts of poly vinyl acetate and 8 weight parts of polypropyl acetate. The active diluent is 2 weight parts of glycerol diallyl ether adipate and 3 weight parts of diallyl phthalate.

Measurement shows that, the pressure-shear strength of the adhesive is 13.5 MPa, the tensile-shear strength thereof is 14.8 MPa, the rebound deflection thereof is 6812.2 MPa, the impact flexibility thereof is 2.43 KJ/m$^2$, the hardness (HSD) thereof is 50.2, and the shrinking percentage thereof is 0.12%.

The usage method of the adhesive is the same as that in Example 1.

Example 3

An adhesive of colored stone comprises 100 weight parts of an unsaturated polyester resin suitable for air-drying, 3 weight parts of hydrogenated castor oil, 130 weight parts of heavy calcium carbonate (300 mesh on the average), 20 weight parts of quartz powder, 8 weight parts of an anti-shrinking agent, and 3 weight parts of an active diluents. The adhesive is cream-colored.

The unsaturated polyester resin suitable for air-drying is allyl glycidyl ether-modified unsaturated polyester resin. The anti-shrinking agent is 3 weight parts of polyacrylate and 5 weight parts of poly(adipate-co-propanetriol). The active diluent is 3 weight parts of diallyl phthalate.

Measurement shows that, the pressure-shear strength of the adhesive is 15.3 MPa, the tensile-shear strength thereof is 16.2 MPa, the rebound deflection thereof is 6704.5 MPa, the impact flexibility thereof is 2.71 KJ/m$^2$, the hardness (HSD) thereof is 54.8, and the shrinking percentage thereof is 0.76%.

The usage method of the adhesive is the same as that in Example 1.

Example 4

An adhesive of colored stone comprises 100 weight parts of an unsaturated polyester resin suitable for air-drying, 2 weight parts of hydrogenated castor oil, 60 weight parts of heavy calcium carbonate (600 mesh on the average), 10 weight parts of talcum powder, 5 weight parts of an anti-shrinking agent, and one weight part of an active diluent. The adhesive is cream-colored.

The unsaturated polyester resin suitable for air-drying is dicyclopentadiene-modified unsaturated polyester resin synthesized using half-esterification. The anti-shrinking agent is 3 weight parts of polyethylene and 2 weight parts of polyacrylate. The active diluent is one weight parts of 2-chlorostyrene.

Measurement shows that, the pressure-shear strength of the adhesive is 17.2 MPa, the tensile-shear strength thereof is 17.8 MPa, the rebound deflection thereof is 6418.3 MPa, the impact flexibility thereof is 2.80 KJ/m$^2$, the hardness (HSD) thereof is 61.8, and the shrinking percentage thereof is 1.27%.

The usage method of the adhesive is the same as that in Example 1.

Example 5

An adhesive of colored stone comprises 100 weight parts of an unsaturated polyester resin suitable for air-drying, 4 weight parts of hydrogenated castor oil, 100 weight parts of heavy calcium carbonate (400 mesh on the average), 30 weight parts of barium sulfate, 10 weight parts of an anti-shrinking agent, and 2 weight parts of an active diluent. The adhesive is cream-colored.

The unsaturated polyester resin suitable for air-drying is trimethylolpropane diallyl ether-modified unsaturated polyester resin. The anti-shrinking agent is 5 weight parts of polystyrene and 5 weight parts of polymethyl methacrylate. The active diluent is 2 weight parts of p-tert-butyl styrene.

Measurement shows that, the pressure-shear strength of the adhesive is 15.7 MPa, the tensile-shear strength thereof is 16.3 MPa, the rebound deflection thereof is 6634.0 MPa, the impact flexibility thereof is 2.78 KJ/m$^2$, the hardness (HSD) thereof is 57.3, and the shrinking percentage thereof is 0.78%.

The usage method of the adhesive is the same as that in Example 1.

Example 6

An adhesive of colored stone comprises 100 weight parts of an unsaturated polyester resin suitable for air-drying, 2 weight parts of hydrogenated castor oil, 150 weight parts of heavy calcium carbonate (400 mesh on the average), 3 weight parts of dolomite powder, 12 weight parts of an anti-shrinking agent, and 4 weight parts of an active diluent. The adhesive is cream-colored.

The unsaturated polyester resin suitable for air-drying is dicyclopentadiene-modified unsaturated polyester resin synthesized using half-esterification. The anti-shrinking agent is 3 weight parts of poly vinyl acetate, 2 weight parts of polyacrylate, 5 weight parts of polystyrene, and 2 weight parts of polyethylene. The active diluent is 2 weight parts of glycerol diallyl ether adipate and 2 weight parts of 2-chlorostyrene.

Measurement shows that, the pressure-shear strength of the adhesive is 15.9 MPa, the tensile-shear strength thereof is 15.8 MPa, the rebound deflection thereof is 6716.6 MPa, the impact flexibility thereof is 2.69 KJ/m$^2$, the hardness (HSD) thereof is 53.6, and the shrinking percentage thereof is 0.15%.

The usage method of the adhesive is the same as that in Example 1.

Example 7

An adhesive of colored stone comprises 100 weight parts of an unsaturated polyester resin suitable for air-drying, 3 weight parts of hydrogenated castor oil, 75 weight parts of calcium carbonate (600 mesh on the average), 8 weight parts of talcum powder, 10 weight parts of an anti-shrinking agent, and 2 weight parts of an active diluent. The adhesive is cream-colored.

The unsaturated polyester resin suitable for air-drying is trimethylolpropane diallyl ether-modified unsaturated polyester resin. The anti-shrinking agent is 3 weight parts of polystyrene and 7 weight parts of polymethyl methacrylate. The active diluent is 2 weight parts of diallyl phthalate.

Measurement shows that, the pressure-shear strength of the adhesive is 17.5 MPa, the tensile-shear strength thereof is 18.1 MPa, the rebound deflection thereof is 6400.3 MPa, the impact flexibility thereof is 2.90 KJ/m$^2$, the hardness (HSD) thereof is 60.9, and the shrinking percentage thereof is 0.88%.

The usage method of the adhesive is the same as that in Example 1.

Example 8

An adhesive of colored stone comprises 100 weight parts of an unsaturated polyester resin suitable for air-drying, 2 weight parts of hydrogenated castor oil, 140 weight parts of calcium carbonate (400 mesh on the average), 4 weight parts of talcum powder, 10 weight parts of an anti-shrinking agent, 5 weight parts of titanium dioxide, and 3 weight parts of an active diluent. The adhesive is white.

The unsaturated polyester resin suitable for air-drying is t dicyclopentadiene-modified unsaturated polyester resin synthesized using half-esterification. The anti-shrinking agent is poly vinyl acetate. The active diluent is p-tert-butyl styrene. The titanium dioxide is rutile.

Measurement shows that, the pressure-shear strength of the adhesive is 15.4 MPa, the tensile-shear strength thereof is 16.2 MPa, the rebound deflection thereof is 6735.8 MPa, the impact flexibility thereof is 2.58 KJ/m$^2$, the hardness (HSD) thereof is 53.2, and the shrinking percentage thereof is 0.08%.

The usage method of the adhesive is the same as that in Example 1.

Example 9

An adhesive of colored stone comprises 100 weight parts of an unsaturated polyester resin suitable for air-drying, 3 weight parts of hydrogenated castor oil, 70 weight parts of calcium carbonate (900 mesh on the average), 6 weight parts of talcum powder, 8 weight parts of an anti-shrinking agent, 10 weight parts of titanium dioxide, and 2 weight parts of an active diluent. The adhesive is white.

The unsaturated polyester resin suitable for air-drying is trimethylolpropane diallyl ether-modified unsaturated polyester resin. The anti-shrinking agent is polyacrylate. The active diluent is 2-chlorostyrene. The titanium dioxide is rutile.

Measurement shows that, the pressure-shear strength of the adhesive is 16.4 MPa, the tensile-shear strength thereof is 17.3 MPa, the rebound deflection thereof is 6013.2 MPa, the impact flexibility thereof is 2.63 KJ/m$^2$, the hardness (HSD) thereof is 62.0, and the shrinking percentage thereof is 0.17%.

The usage method of the adhesive is the same as that in Example 1.

Example 10

An adhesive of colored stone comprises 100 weight parts of an unsaturated polyester resin suitable for air-drying, 2.5 weight parts of hydrogenated castor oil, 110 weight parts of heavy calcium carbonate (700 mesh on the average), 5 weight parts of talcum powder, 9 weight parts of an anti-shrinking agent, 15 weight parts of titanium dioxide, and 5 weight parts of an active diluent. The adhesive is white.

The unsaturated polyester resin suitable for air-drying is trimethylolpropane diallyl ether-modified unsaturated polyester resin. The anti-shrinking agent is polymethyl methacrylate. The active diluent is one weight part of styrene, one weight part of α-methyl styrene, one weight part of glycerol diallyl ether adipate, one weight part of diallyl phthalate, and one weight part of 2-chlorostyrene. The titanium dioxide is rutile.

Measurement shows that, the pressure-shear strength of the adhesive is 15.6 MPa, the tensile-shear strength thereof is 16.0 MPa, the rebound deflection thereof is 6217.8 MPa, the impact flexibility thereof is 2.48 KJ/m$^2$, the hardness (HSD) thereof is 56.8, and the shrinking percentage thereof is 0.49%.

The usage method of the adhesive is the same as that in Example 1.

Example 11

An adhesive of colored stone comprises 100 weight parts of an unsaturated polyester resin suitable for air-drying, 2 weight parts of hydrogenated castor oil, 150 weight parts of calcium carbonate (500 mesh on the average), 2 weight parts of talcum powder, 10 weight parts of an anti-shrinking agent, 20 weight parts of titanium dioxide, and 5 weight parts of an active diluent. The adhesive is white.

The unsaturated polyester resin suitable for air-drying is allyl glycidyl ether-modified unsaturated polyester resin. The anti-shrinking agent is 2 weight parts of poly vinyl acetate, 2 weight parts of polyacrylate, 2 weight parts of polystyrene, 2 weight parts of polyethylene, and 2 weight parts of polyvinyl chloride. The active diluent is 2 weight parts of glycerol diallyl ether adipate, one weight part of diallyl phthalate, one weight part of 2-chlorostyrene, and one weight part of p-tert-butyl styrene.

Measurement shows that, the pressure-shear strength of the adhesive is 15.0 MPa, the tensile-shear strength thereof is 15.7 MPa, the rebound deflection thereof is 6325.4 MPa, the impact flexibility thereof is 2.45 KJ/m$^2$, the hardness (HSD) thereof is 53.7, and the shrinking percentage thereof is 0.32%.

The usage method of the adhesive is the same as that in Example 1.

Example 12

An adhesive of colored stone comprises 100 weight parts of an unsaturated polyester resin suitable for air-drying, 2 weight parts of hydrogenated castor oil, 150 weight parts of heavy calcium carbonate (500 mesh on the average), 4 weight parts of talcum powder, 10 weight parts of an anti-shrinking agent, 4 weight parts of an active diluent, and a red pigment (the pigment is added according to the requirement of the colloid, and the usage amount thereof is dependent on the depth of the pigment). The adhesive is red.

The unsaturated polyester resin suitable for air-drying is dicyclopentadiene-modified unsaturated polyester resin synthesized using half-esterification. The anti-shrinking agent is polyacrylate. The active diluent is 2 weight parts of glycerol diallyl ether adipate and 2 weight parts of diallyl phthalate.

Measurement shows that, the pressure-shear strength of the adhesive is 15.8 MPa, the tensile-shear strength thereof is 16.1 MPa, the rebound deflection thereof is 6689.5 MPa, the impact flexibility thereof is 2.73 KJ/m$^2$, the hardness (HSD) thereof is 54.0, and the shrinking percentage thereof is 0.06%.

The usage method of the adhesive is the same as that in Example 1.

Example 13

An adhesive of colored stone comprises 100 weight parts of an unsaturated polyester resin suitable for air-drying, 2 weight parts of hydrogenated castor oil, 150 weight parts of heavy calcium carbonate (400 mesh on the average), 4 weight parts of talcum powder, 10 weight parts of an anti-shrinking agent, 3 weight parts of an active diluent, and a yellow pigment (the pigment is added according to the requirement of the colloid, and the usage amount thereof is dependent on the depth of the pigment). The adhesive is yellow.

The unsaturated polyester resin suitable for air-drying is allyl glycidyl ether-modified unsaturated polyester resin. The anti-shrinking agent is 6 weight parts of poly vinyl acetate and 4 weight parts of polymethyl methacrylate. The active diluent is 2 weight parts of diallyl phthalate and one weight part of 2-chlorostyrene.

Measurement shows that, the pressure-shear strength of the adhesive is 15.5 MPa, the tensile-shear strength thereof is 16.4 MPa, the rebound deflection thereof is 6604.9 MPa, the impact flexibility thereof is 2.78 KJ/m$^2$, the hardness (HSD) thereof is 54.2, and the shrinking percentage thereof is 0.16%.

The usage method of the adhesive is the same as that in Example 1.

Example 14

An adhesive of colored stone comprises 100 weight parts of an unsaturated polyester resin suitable for air-drying, 3 weight parts of hydrogenated castor oil, 10 weight parts of calcium carbonate (800 mesh on the average), 10 weight parts of an anti-shrinking agent, 3 weight parts of an active diluent, and a yellow pigment (the pigment is added according to the requirement of the colloid, and the usage amount thereof is dependent on the depth of the pigment). The adhesive is yellow.

The unsaturated polyester resin suitable for air-drying is allyl glycidyl ether-modified unsaturated polyester resin. The anti-shrinking agent is 6 weight parts of poly vinyl acetate and 4 weight parts of polymethyl methacrylate. The active diluent is 2 weight parts of diallyl phthalate and one weight part of 2-chlorostyrene.

Measurement shows that, the pressure-shear strength of the adhesive is 15.9 MPa, the tensile-shear strength thereof is 14.7 MPa, the rebound deflection thereof is 6507.3 MPa, the impact flexibility thereof is 2.56 KJ/m$^2$, the hardness (HSD) thereof is 63.5, and the shrinking percentage thereof is 0.21%.

The usage method of the adhesive is the same as that in Example 1.

Example 15

An adhesive of colored stone comprises 100 weight parts of an unsaturated polyester resin suitable for air-drying, 3 weight parts of hydrogenated castor oil, 100 weight parts of calcium carbonate (300 mesh on the average), 150 weight parts of barium sulfate, 10 weight parts of an anti-shrinking agent, 3 weight parts of an active diluent, and a yellow pigment (the pigment is added according to the requirement of the colloid, and the usage amount thereof is dependent on the depth of the pigment). The adhesive is yellow.

The unsaturated polyester resin suitable for air-drying is allyl glycidyl ether-modified unsaturated polyester resin. The anti-shrinking agent is 6 weight parts of poly vinyl acetate and 4 weight parts of polymethyl methacrylate. The active diluent is 2 weight parts of diallyl phthalate and one weight part of 2-chlorostyrene.

Measurement shows that, the pressure-shear strength of the adhesive is 13.1 MPa, the tensile-shear strength thereof is 13.9 MPa, the rebound deflection thereof is 6613.5 MPa, the impact flexibility thereof is 2.37 KJ/m$^2$, the hardness (HSD) thereof is 50.3, and the shrinking percentage thereof is 0.27%.

The usage method of the adhesive is the same as that in Example 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An adhesive comprising: at least 100 weight parts of an unsaturated polyester resin, between 1 and 5 weight parts of hydrogenated castor oil, between 10 and 250 weight parts of a filler, and between 1 and 15 weight parts of an anti-shrinking agent;
wherein:
said unsaturated polyester resin is allyl glycidyl ether-modified unsaturated polyester resin, or trimethylolpropane diallyl ether-modified unsaturated polyester resin; and
said anti-shrinking agent is poly(adipate-co-propanetriol), poly vinyl acetate, polyacrylate, polystyrene, polyethylene, polyvinyl chloride, polymethyl methacrylate, or a mixture thereof.

2. An adhesive comprising: at least 100 weight parts of an unsaturated polyester resin, between 1 and 5 weight parts of hydrogenated castor oil, between 10 and 250 weight parts of a filler, between 1 and 15 weight parts of an anti-shrinking agent, and between 1 and 5 weight parts of an active diluent;
wherein:
said unsaturated polyester resin is allyl glycidyl ether-modified unsaturated polyester resin, or trimethylolpropane diallyl ether-modified unsaturated polyester resin;
said anti-shrinking agent is poly(adipate-co-propanetriol), poly vinyl acetate, polyacrylate, polyethylene, polyvinyl chloride, polymethyl methacrylate, or a mixture thereof;
said active diluent is glycerol diallyl ether adipate, diallyl phthalate, 2-chlorostyrene, p-tert-butyl styrene, and a mixture thereof; and
said filler is calcium carbonate, talcum powder, quartz powder, dolomite powder, barium sulfate, or a mixture thereof.

3. An adhesive consisting of: at least 100 weight parts of an unsaturated polyester resin, between 1 and 5 weight parts of hydrogenated castor oil, between 10 and 250 weight parts of a filler, between 1 and 15 weight parts of an anti-shrinking agent, and between 1 and 5 weight parts of an active diluent;
wherein:
said unsaturated polyester resin is allyl glycidyl ether-modified unsaturated polyester resin, said anti-shrinking agent is a mixture of polyacrylate and poly(adipate-co-propanetriol), said active diluent is diallyl phthalate, and said filler is a mixture of calcium carbonate and quartz powder.

4. An adhesive consisting of: at least 100 weight parts of an unsaturated polyester resin, between 1 and 5 weight parts of hydrogenated castor oil, between 10 and 250 weight parts of a filler, between 1 and 15 weight parts of an anti-shrinking agent, and between 1 and 5 weight parts of an active diluent;
wherein
said unsaturated polyester resin is trimethylolpropane diallyl ether-modified unsaturated polyester resin, said anti-shrinking agent is a mixture of polystyrene and polymethyl methacrylate, said active diluent is p-tert-butyl styrene, and said filler is a mixture of calcium carbonate and barium sulfate.

5. An adhesive consisting of: at least 100 weight parts of an unsaturated polyester resin, between 1 and 5 weight parts of hydrogenated castor oil, between 10 and 250 weight parts of a filler, between 1 and 15 weight parts of an anti-shrinking agent, and between 1 and 5 weight parts of an active diluent; wherein
    said unsaturated polyester resin is trimethylolpropane diallyl ether-modified unsaturated polyester resin, said anti-shrinking agent is a mixture of polystyrene and polymethyl methacrylate, said active diluent is diallyl phthalate, and said filler is a mixture of calcium carbonate and talcum powder.

6. An adhesive consisting of: at least 100 weight parts of an unsaturated polyester resin, between 1 and 5 weight parts of hydrogenated castor oil, between 10 and 250 weight parts of a filler, between 1 and 15 weight parts of an anti-shrinking agent, and between 1 and 5 weight parts of an active diluent; wherein
    said unsaturated polyester resin is trimethylolpropane diallyl ether-modified unsaturated polyester resin, said anti-shrinking agent is polyacrylate, said active diluent is 2-chlorostyrene, and said filler is titanium dioxide.

7. An adhesive consisting of: at least 100 weight parts of an unsaturated polyester resin, between 1 and 5 weight parts of hydrogenated castor oil, between 10 and 250 weight parts of a filler, between 1 and 15 weight parts of an anti-shrinking agent, and between 1 and 5 weight parts of an active diluent; wherein
    said unsaturated polyester resin is trimethylolpropane diallyl ether-modified unsaturated polyester resin, said anti-shrinking agent is polymethyl methacrylate, said active diluent is a mixture of styrene, $\alpha$-methyl styrene, glycerol diallyl ether adipate, diallyl phthalate, and 2-chlorostyrene, and said filler is titanium dioxide.

8. An adhesive consisting of: at least 100 weight parts of an unsaturated polyester resin, between 1 and 5 weight parts of hydrogenated castor oil, between 10 and 250 weight parts of a filler, between 1 and 15 weight parts of an anti-shrinking agent, and between 1 and 5 weight parts of an active diluent; wherein
    said unsaturated polyester resin is allyl glycidyl ether-modified unsaturated polyester resin, said anti-shrinking agent is a mixture of poly vinyl acetate, polyacrylate, polystyrene, polyethylene, and polyvinyl chloride, said active diluent is a mixture of glycerol diallyl ether adipate, diallyl phthalate, 2-chlorostyrene, and p-tert-butyl styrene, and said filler is a mixture of calcium carbonate, talcum powder, and titanium dioxide.

\* \* \* \* \*